US008581139B2

(12) United States Patent
Severance, Jr.

(10) Patent No.: US 8,581,139 B2
(45) **Date of Patent: *Nov. 12, 2013**

(54) ELECTRODE AND ELECTRODE HOLDER WITH THREADED CONNECTION

(75) Inventor: Wayne Stanley Severance, Jr., Darlington, SC (US)

(73) Assignee: The ESAB Group, Inc., Florence, SC (US)

(*) Notice: Subject to any disclaimer, the term of this patent is extended or adjusted under 35 U.S.C. 154(b) by 283 days.

This patent is subject to a terminal disclaimer.

(21) Appl. No.: 12/960,797

(22) Filed: Dec. 6, 2010

(65) Prior Publication Data

US 2011/0073574 A1 Mar. 31, 2011

Related U.S. Application Data

(62) Division of application No. 12/187,747, filed on Aug. 7, 2008, now abandoned, which is a division of application No. 11/419,405, filed on May 19, 2006, now Pat. No. 7,423,235.

(51) Int. Cl.
*B23K 9/00* (2006.01)

(52) U.S. Cl.
USPC ............ 219/121.59; 219/121.52; 219/121.48; 313/231.31; 403/296

(58) Field of Classification Search
USPC ................ 219/74, 75, 121.46, 121.48, 121.5, 219/121.52, 136, 137.42, 137.31, 137.61; 313/231.31, 231.34; 315/82, 88, 315/111.51; 403/296; 445/35
See application file for complete search history.

(56) References Cited

U.S. PATENT DOCUMENTS 1,828,856 A 10/1931 Bridges
4,152,533 A 5/1979 Gazda (Continued)

FOREIGN PATENT DOCUMENTS

DE 42 34 267 A1 4/1993
EP 0 599 211 A1 11/1993

(Continued)

OTHER PUBLICATIONS

Extended European Search Report for European Patent Application No. 05 019 097.4, mailed Apr. 14, 2011.

(Continued)

*Primary Examiner* — Brian Jennison
(74) *Attorney, Agent, or Firm* — Kacvinsky Daisak PLLC

(57) ABSTRACT

A threaded connection for an electrode holder and an electrode in a plasma arc torch is provided. The threaded connection has relatively low height, and the engaged portion of a male threaded portion of the electrode and a female threaded portion of the electrode holder are positioned at least partially within a nozzle chamber. In one inventive aspect, the nominal pitch diameter of the electrode is less than the minor diameter of the electrode. In another, the width of the root area of the electrode thread is wider than the width of the root area of the electrode holder thread by at least about 35%. The width of the root area of the electrode is at least about 15% wider than the width of the crest portion of the electrode. As such, the less consumable of the two parts, the electrode holder, is provided with a thread that is less likely to be worn and damaged. In one particular embodiment, the crest profile of the electrode is that of a Stub Acme thread separated by a larger root profile.

12 Claims, 8 Drawing Sheets

(56) References Cited

U.S. PATENT DOCUMENTS

| | | | |
|---|---|---|---|
| 4,375,340 A | 3/1983 | Faircloth, Jr. | |
| 4,954,683 A | 9/1990 | Hatch | |
| 5,023,425 A | 6/1991 | Severance, Jr. | |
| 5,039,837 A | 8/1991 | Nourbakhsh et al. | |
| 5,052,871 A | 10/1991 | Collins | |
| 5,097,111 A | 3/1992 | Severance, Jr. | |
| 5,124,525 A | 6/1992 | Severance, Jr. et al. | |
| 5,160,327 A | 11/1992 | Stines | |
| 5,336,015 A * | 8/1994 | Stewart et al. | 403/296 |
| 5,451,739 A | 9/1995 | Nemchinsky et al. | |
| 5,473,140 A | 12/1995 | Colling | |
| 5,491,321 A | 2/1996 | Stuart et al. | |
| 5,676,864 A | 10/1997 | Walters | |
| 5,681,489 A | 10/1997 | Carkhuff | |
| 5,685,680 A | 11/1997 | Duffy et al. | |
| 5,747,767 A | 5/1998 | Severance et al. | |
| 5,760,373 A | 6/1998 | Colling | |
| 5,767,472 A | 6/1998 | Walters | |
| 5,911,894 A | 6/1999 | Colling | |
| 6,156,995 A | 12/2000 | Severance, Jr. | |
| 6,307,179 B1 | 10/2001 | Walters, III | |
| 6,346,685 B2 | 2/2002 | Severance, Jr. et al. | |
| 6,362,450 B1 * | 3/2002 | Severance, Jr. | 219/121.5 |
| 6,525,291 B1 | 2/2003 | Sanders et al. | |
| 6,525,297 B2 | 2/2003 | Doherty | |
| 6,563,075 B1 | 5/2003 | Severance, Jr. et al. | |
| 6,686,559 B1 | 2/2004 | Walters | |
| 6,689,987 B2 | 2/2004 | Altekruse et al. | |
| 2003/0173339 A1 | 9/2003 | Fryer et al. | |
| 2003/0209525 A1 | 11/2003 | Walters | |

FOREIGN PATENT DOCUMENTS

| | | |
|---|---|---|
| JP | 61-253140 A | 11/1986 |
| JP | 01-183315 A | 7/1989 |
| JP | 3-35112 A | 2/1991 |
| JP | 06-015875 Y | 3/1994 |
| JP | 09-141446 A | 6/1997 |
| JP | 2002-102407 A | 4/2002 |
| JP | 2002-248576 A | 9/2002 |
| JP | 2004-90013 A | 3/2004 |

OTHER PUBLICATIONS

*ASME/ANSI B1.8-1988 Stub Acme Screw Threads*; American National Standards for Screw Threads; 1988; pp. 1-30; The American Society of Mechanical Engineers.

Erik Oberg, Franklin D. Jones and Holbrook L. Horton; *Screw Threads*; Machinery's Handbook: A Reference Book for the Mechanical Engineer, Draftsman, Toolmaker and Machinist; 1979; pp. 1259-1260; 21$^{st}$ Edition, First Printing; Industrial Press Inc.; New York, NY.

Joseph Shigley and Larry D. Mitchell; *Design of Mechanical Elements—The Design of Screws, Fasteners, and Connections: 8-1 Thread Standards and Definitions*; Mechanical Engineering Design—4$^{th}$ Edition; 1983; pp. 358-360; McGraw Hill Book Company.

Antonio F. Baldo; *8.2 Machine Elements: Screw Fastenings*; Marks' Standard Handbook for Mechanical Engineers—10$^{th}$ Edition; 1987; pp. 8-8-8-17; McGraw Hill.

*ASME B1.1-1989 Unified Inch Screw Threads* (*UN and UNR Thread Form*); The American Society of Mechanical Engineers; 1989; pp. 1-23, 52-55, 65-83, 137-139 and 141.

Chart—Dimension Values for Various Conventional Threads, 1991.

Drawing—Esab PT-26 Torch, 1991.

ISO Standard's Handbook 18, *Fasteners and Screw Threads*, (1984), pp. 576-577 and 630-631.

Oberg, E., *Machinery's Handbook*, 24$^{th}$ Edition, Fourth Printing, Industrial Press Inc., New York, New York, (1992), pp. 1582-1583 and 1594-1595.

Office Action from Japanese Patent Appl. No. 2005-256247, mailed Aug. 13, 2010.

Preliminary Report of Issuance of Office Action for Japanese Patent Appl. No. 2005-256247, mailed Aug. 16, 2010.

* cited by examiner

ELECTRODE AND ELECTRODE HOLDER WITH THREADED CONNECTION

CROSS-REFERENCE TO RELATED APPLICATIONS

This application is a divisional of U.S. application Ser. No. 12/187,747 filed Aug. 7, 2008, now abandoned, which is a divisional of U.S. application Ser. No. 11/419,405, filed May 19, 2006, now U.S. Pat. No. 7,423,235, said applications being hereby incorporated herein in their entirety by reference.

BACKGROUND OF THE INVENTION

1) Field of the Invention

The present invention relates to plasma arc torches and, in particular, to plasma arc torches wherein an electrode and an electrode holder are held to each other or to the torch by way of a threaded connection.

2) Description of Related Art

Plasma arc torches are commonly used for the working of metal including cutting, welding, surface treatment, melting and annealing. Such torches include an electrode that supports an arc that extends from the electrode to a workpiece in a transferred-arc mode of operation. It is also conventional to surround the arc with a swirling vortex flow of gas, and in some torch designs it is conventional to also envelop the gas and arc in a swirling jet of water.

The electrode used in conventional torches of the described type typically comprises an elongate tubular member composed of a material of high thermal conductivity, such as copper or copper alloy. The forward or discharge end of the tubular electrode includes a bottom end wall having an emissive element embedded therein that supports the arc. The opposite end of the electrode holds the electrode in the torch by way of a threaded connection to an electrode holder. The electrode holder is typically an elongate structure held to the torch body by a threaded connection at an end opposite the end at which the electrode is held. The electrode holder and the electrode define a threaded connection for holding the electrode to the electrode holder.

The emissive element of the electrode is composed of a material that has a relatively low work function, which is defined in the art as the potential step, measured in electron volts (eV), which promotes thermionic emission from the surface of a metal at a given temperature. In view of this low work function, the element is thus capable of readily emitting electrons when an electrical potential is applied thereto. Commonly used emissive materials include hafnium, zirconium, tungsten, and alloys thereof.

A nozzle surrounds the discharge end of the electrode and provides a pathway for directing the arc towards the workpiece. To ensure that the arc is emitted through the nozzle and not from the nozzle surface during regular, transferred-arc operation, the electrode and the nozzle are maintained at different electrical potential relative to each other. Thus, it is important that the nozzle and the electrode are electrically separated, and this is typically achieved by maintaining a predetermined physical gap between the components. The volume defining the gap is most typically filled with flowing air or some other gas used in the torch operation.

The heat generated by the plasma arc is great. The torch component that is subjected to the most intense heating is the electrode. To improve the service life of a plasma arc torch, it is generally desirable to maintain the various components of the torch at the lowest possible temperature notwithstanding this heat generation. A passageway or bore is formed through the electrode holder and the electrode, and a coolant such as water is circulated through the passageway to cool the electrode.

Even with the water-cooling, the electrode has a limited life span and is considered a consumable part. Thus, in the normal course of operation, a torch operator must periodically replace a consumed electrode by first removing the nozzle and then unthreading the electrode from the electrode holder. A new electrode is then screwed onto the electrode holder and the nozzle is reinstalled so that the plasma arc torch can resume operation.

The design of the threaded connection between the electrode holder and the electrode must take into account various constraints. First, the threaded connection must be structurally strong enough to securely hold the electrode to the electrode holder. Second, in the case of water-cooled torches, the threaded connection should allow for sealing between the electrode holder and the electrode so that the cooling water cannot escape. The sealing is typically achieved by way of an o-ring, and so the threaded connection should allow sufficient room for such an o-ring. Third, a considerable current is passed through the electrode holder to the electrode, in some cases up to 1,000 amperes of cutting current. Thus, the threaded connection should provide sufficient contact surface area between the electrode and the electrode holder to allow this current to pass through. Finally, the cost of manufacturing the electrode should be as small as possible, especially because the electrode is a consumable part. Similar considerations exist with respect to the threaded connection holding the electrode holder to the torch body.

One way that this cost can be reduced is to make the electrode shorter, thus reducing material cost and manufacturing cost. This can be achieved by making the electrode holder longer to compensate for the shorter length of the electrode so that the total length of the electrode holder and electrode remains the same. However, the length of the electrode holder is limited by the nozzle geometry because the threaded connection between the electrode holder and the electrode in many conventional torches is too large to extend into the nozzle chamber and still meet the design constraints noted above.

In particular, the threaded connection in present designs sometimes comprises an enlarged female-threaded portion at the end of the electrode holder that is radially larger than the adjacent male-threaded end of the electrode. Thus, if such a conventional threaded connection were designed to extend into the nozzle, then the gap between the electrode holder and the nozzle would decrease. As noted above, the electrode and electrode holder are at one electrical potential and the nozzle is at a different electrical potential. Thus, the decrease in the gap might cause undesired arcing within the torch from the nozzle to the electrode holder.

This particular problem has been resolved in part in some prior torches by forming a threaded connection using a male thread for the electrode holder and a female thread for the electrode. One advantage of this approach is that the electrode holder is protected from damage because any arcing that does occur inside the torch extends from the outside of the electrode to the nozzle, and not from the electrode holder to the nozzle, because the outer surface of the female-threaded portion of the electrode is radially closest to the remainder of the torch. Because the electrode must be periodically replaced when the emissive end is spent in any event, damage to the threaded end of the electrode is less of a concern than it is to the electrode holder.

One disadvantage of this approach, however, is that female threads are generally more difficult to machine and thus are more expensive than male threads. Even though the electrode holder can sometimes be a consumable part, the rate of consumption is typically less than that of the electrode, and thus this configuration can have an undesirable cost structure. The more frequently replaced part must be subjected to the more expensive of the two machining operations necessary for making a threaded connection.

Another way to resolve at least some of these design constraints is to use a fine thread. A fine thread allows a shorter thread height (i.e. the dimension of the thread in the radial direction) than a corresponding coarser thread as used in conventional torches. This reduced thread height allows more of a gap between the threaded connection and the nozzle. However, fine threads are more difficult to machine and thus can be more expensive. In addition, fine threads are more delicate, are quicker to become unusably worn on the electrode holder when electrodes are repeatedly replaced, and are more likely to be improperly cross-threaded when an operator is installing a new electrode.

Thus, there is a need in the industry for an electrode and an electrode holder where the threaded connection therebetween is capable of meeting all of the electrical, structural and sealing constraints required in a plasma arc torch, but yet which is capable of being positioned at least partially within a nozzle of the plasma arc torch without detrimental arcing occurring between the threaded connection and the nozzle. Such a threaded connection would preferably be relatively easy to manufacture and would involve limited risks of cross-threading when the electrode is attached to the electrode holder.

In addition, it would be desirable to provide an electrode that can be secured to the electrode holder by way of a threaded connection where the machining and material costs, and the possibilities of premature wear and damage, are reduced for the electrode. Because the costs and possibility for damage in such an arrangement would be distributed more to the more-consumable electrode than to the less-consumable electrode holder, the long-term costs of operating the plasma arc torch would be reduced. Similar advantages would also be beneficial for the threaded connection between the electrode holder and the torch body.

BRIEF SUMMARY OF THE INVENTION

These and other objects and advantages are provided by the present invention, which includes an electrode holder and an electrode that is removably held to the electrode holder by a novel threaded connection. The novel threaded connection has relatively low height and, in another aspect of the invention, the engaged portion of a male thread of the electrode and a female thread of the electrode holder can be positioned at least partially within a nozzle chamber of the plasma arc torch. In one embodiment of the novel threaded connection, the width of the root portion of the electrode thread is wider than the width of the root portion of the electrode holder thread by at least 35%. As such, the less-consumable of the two parts, the electrode holder, is provided with a more robust crest for its thread that is less likely to be worn and damaged relative to the crest of the thread of the more-consumable electrode. In a particular embodiment, the crest profile of the electrode thread and the root profile of the electrode holder thread are consistent with those of a Stub Acme thread.

More specifically, the electrode has a male threaded portion for removably holding the electrode in the plasma arc torch and defines at least one thread form extending helically and at least partially around a thread axis. This threaded portion defines a major diameter comprising a larger diameter of the threaded portion and a minor diameter comprising a smaller diameter of the threaded portion. At least two flanks define at least one crest profile of the thread form, and each flank extends between the major diameter and the minor diameter. Each of the flanks of the crest profile defines at least one line when viewed in cross section that intersects at a crest apex with the line defined by the other of the flanks of the crest profile. In addition, the lines of adjacent flanks of adjacent crest profiles intersect at a root apex. Thus, a nominal pitch diameter can be defined as lying halfway between the diameter of the crest apex and the diameter of the root apex.

According to one inventive aspect of the threaded connection of the present invention, the crests of the male thread are narrower than the roots of the male thread. This can be geometrically defined by saying that the nominal pitch diameter of the electrode is not greater than the minor diameter of the electrode. In another, the nominal pitch diameter of the electrode is smaller than the minor diameter of the female thread of the electrode holder. In a conventional thread, the nominal pitch diameter as defined herein would be closer to or at the midpoint between the minor and major diameters of the respective components. Another advantage of the present invention is that the electrode holder can be held to the plasma arc torch body by a male thread at the opposite end from the electrode, which male thread corresponds at least in shape to the male thread of the electrode and provides similar advantages inasmuch as the electrode holder can also be consumable, at least relative to the plasma arc torch body.

Another way of defining the novel threaded connection of the electrode and the electrode holder that embodies the benefits of the invention is to recognize that each defines a mean diameter between the major diameter and the minor diameter. As such, a crest portion extends in one direction from the mean diameter, and a root area extends in an opposite direction from the mean diameter and defines a width along the mean diameter. Advantageously, the width of the root area of the thread of the electrode is wider than the width of the root area of the thread of the electrode holder, and in particular is at least about 35% wider. The root area of the electrode may be at least about 45% wider than the root area of the electrode holder, and further can be at least about 55% wider than the root area of the electrode holder. In addition, with regard to the threaded portion of the electrode, the width of the root area is greater than the width of the crest portion by at least 15%, and can be at least about 55% greater than the width of the crest portion, and may be 95% wider or more.

In another aspect of the present invention, a method of manufacturing the body of an electrode for a plasma arc torch comprises the steps of:

- forming an electrode blank from a base material and defining at least one external cylindrical surface;
- removing material from the cylindrical surface so as to define at least one helical thread form in the electrode blank, the removing step comprising the steps of;
  - removing material so as to form flanks defining the thread form, the flanks defining at least one line when viewed in cross section that intersects at a crest apex with a line defined by another of the flanks and also intersects at a root apex with a line defined by yet another of the flanks, and
- discontinuing the removal of material at a depth from the cylindrical surface that is above a depth halfway between the root apex and the crest apex.

Thus, the present invention solves the problems recognized above in that the novel threaded connection provides for the more-consumable electrode to be formed with less material relative to the electrode holder. Some electrodes can be made much shorter as compared to conventional electrodes for corresponding torches. In addition, any threading damage or wear as between the electrode and electrode holder is less likely to be suffered by the less consumable of the two parts, the electrode holder. Advantageously, the present invention also provides for an electrode and electrode holder threaded engagement to be positioned at least partially within the nozzle chamber of the torch with the male thread on the electrode.

BRIEF DESCRIPTION OF THE SEVERAL VIEWS OF THE DRAWINGS

Figure 1:
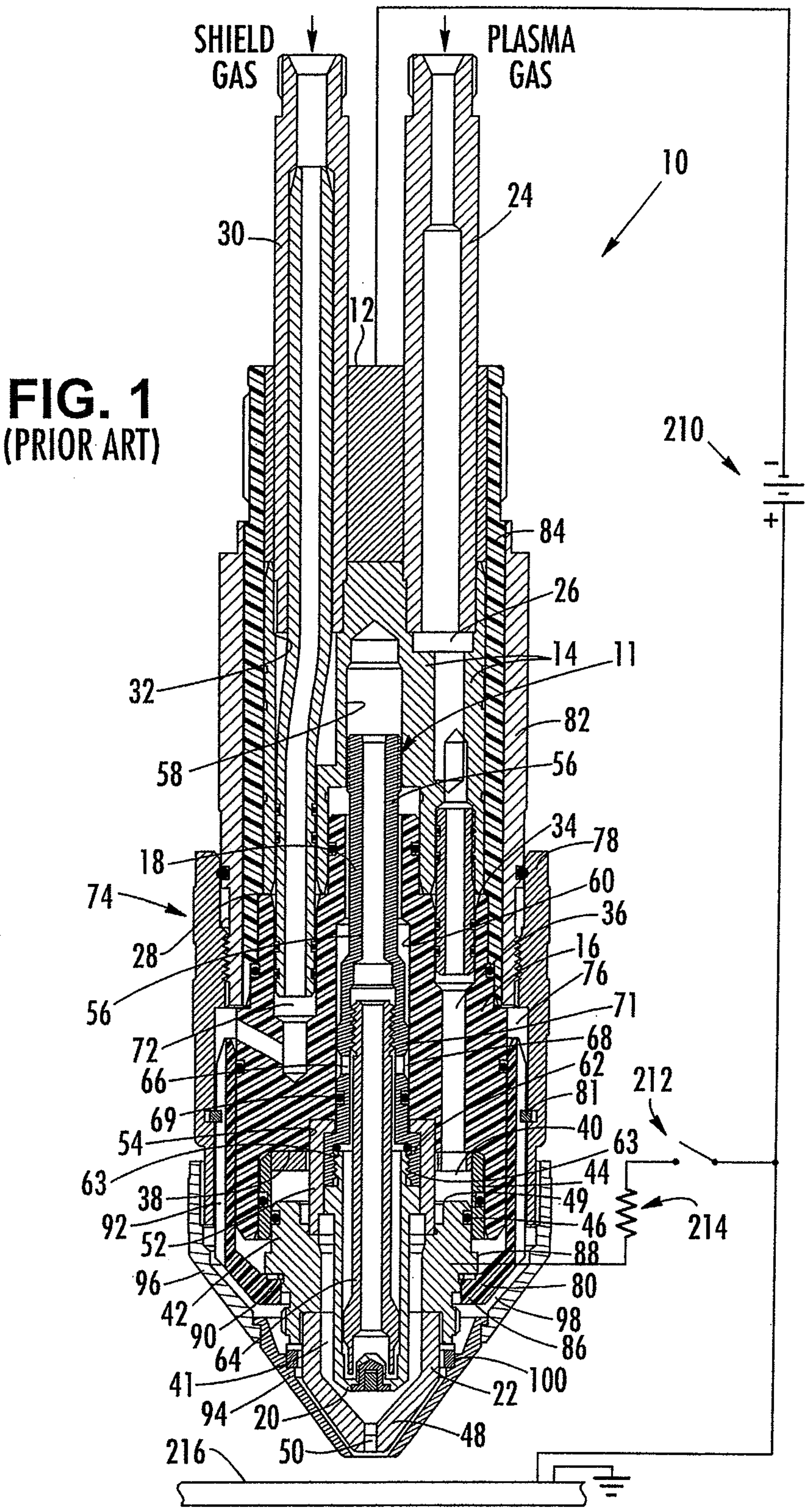
FIG. 1 (PRIOR ART)
Figure 2:
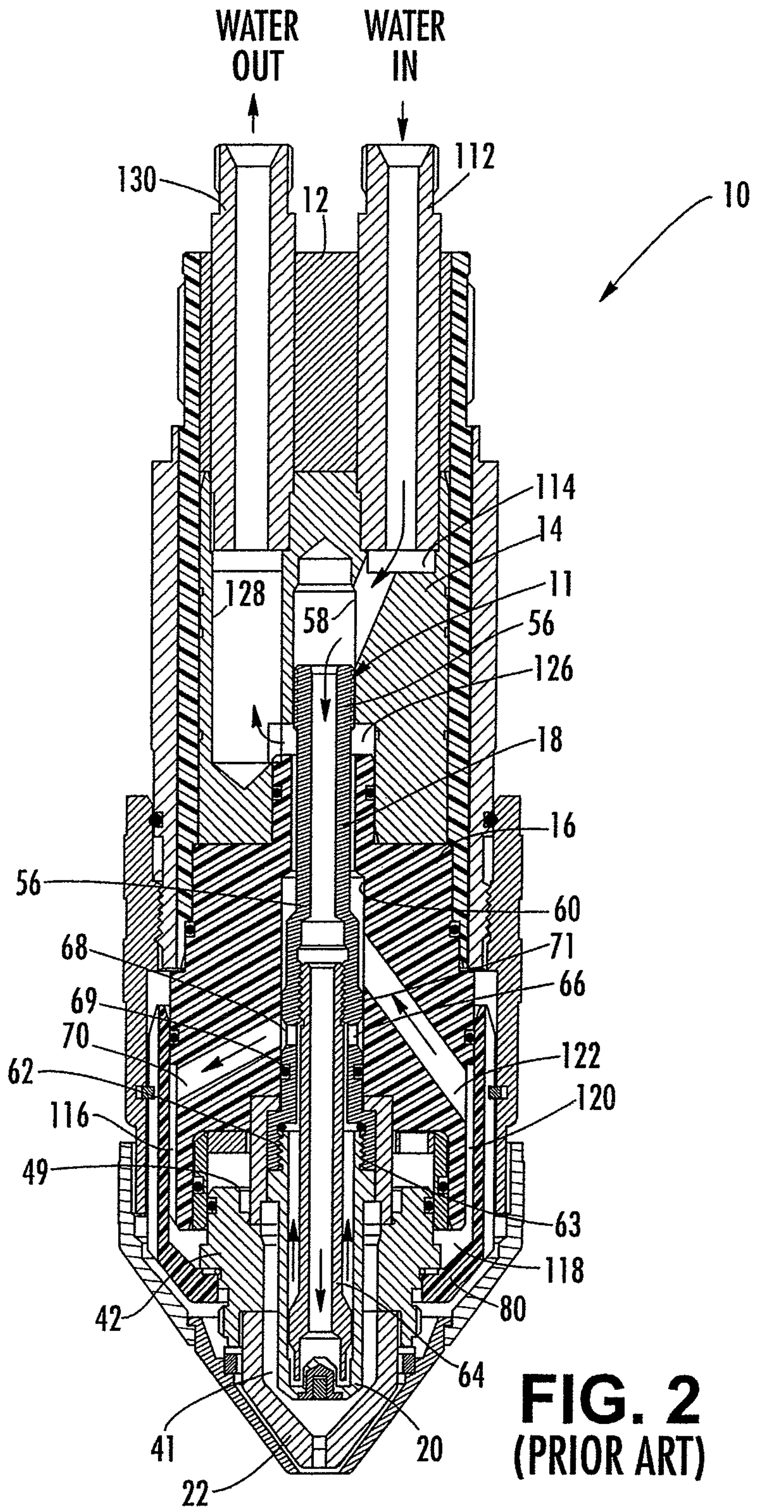
FIG. 2 (PRIOR ART)
Figure 3:
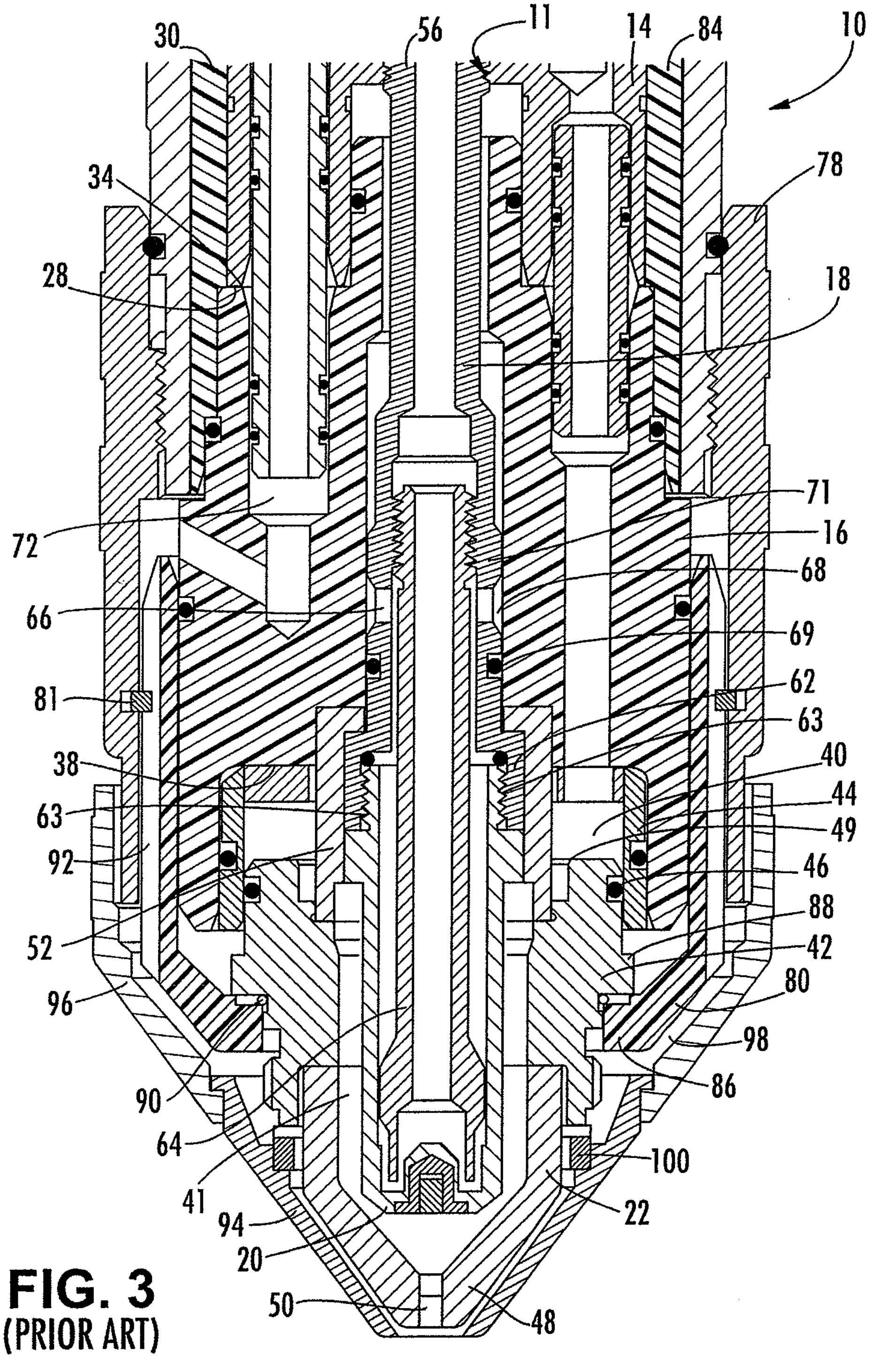
FIG. 3 (PRIOR ART)
Figure 4:
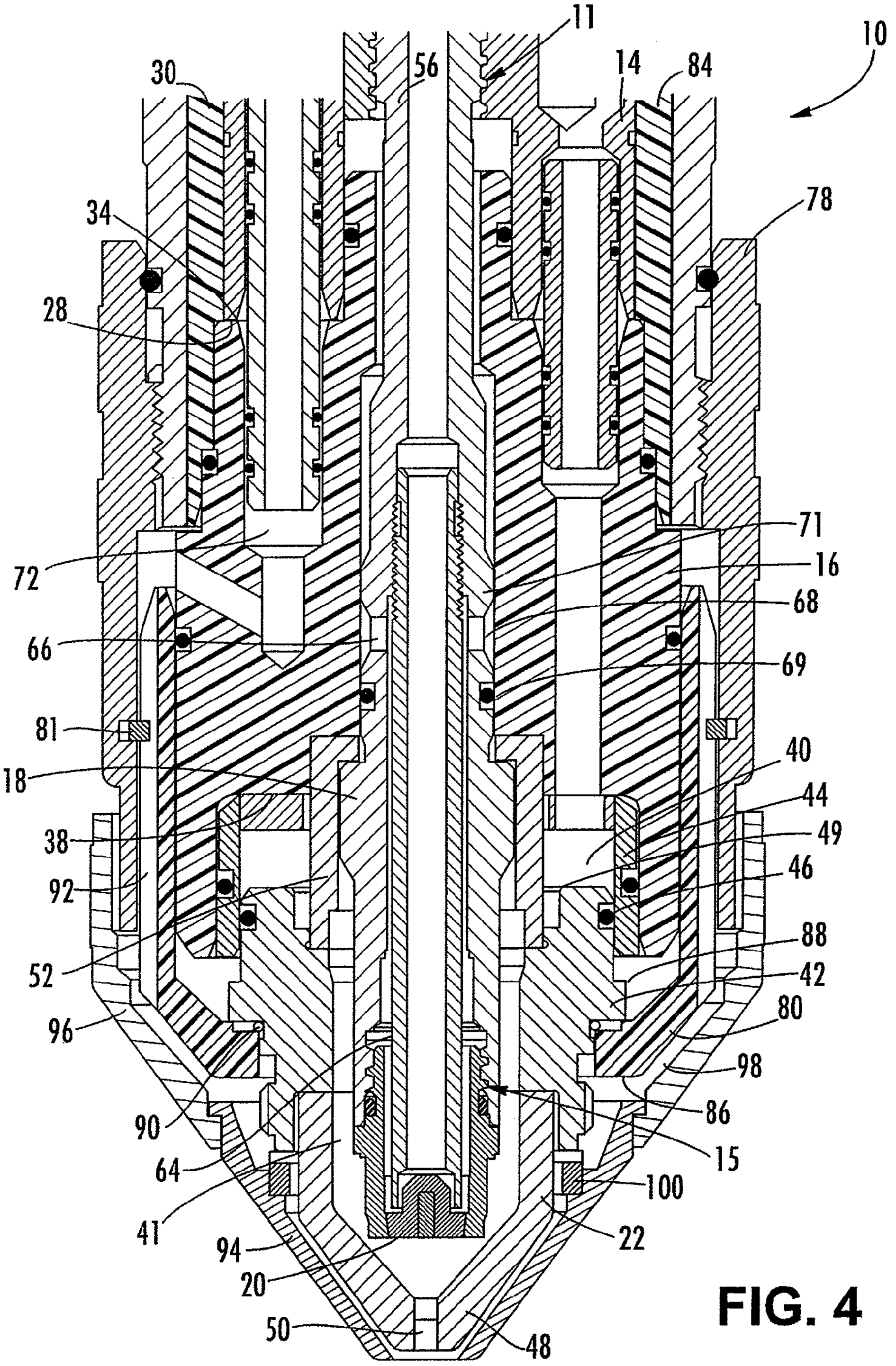
Figure 5:
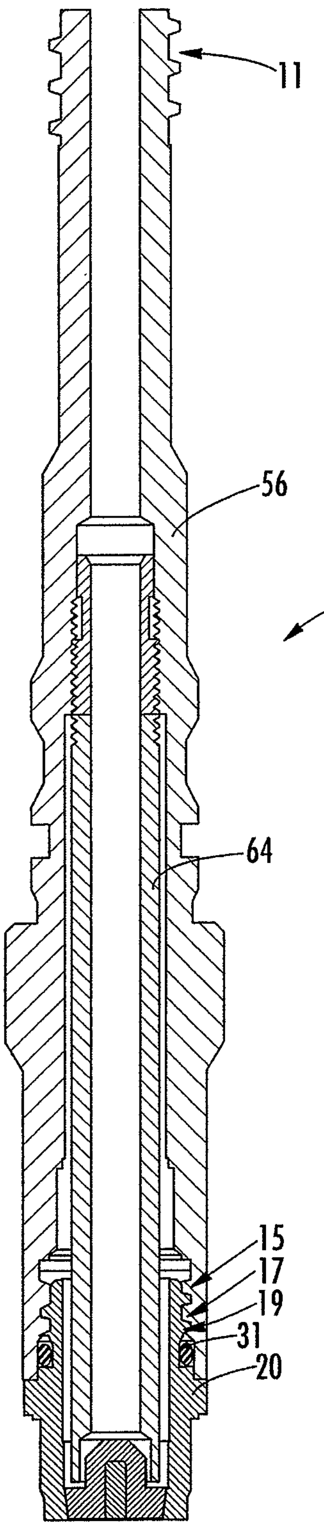
Figure 6:
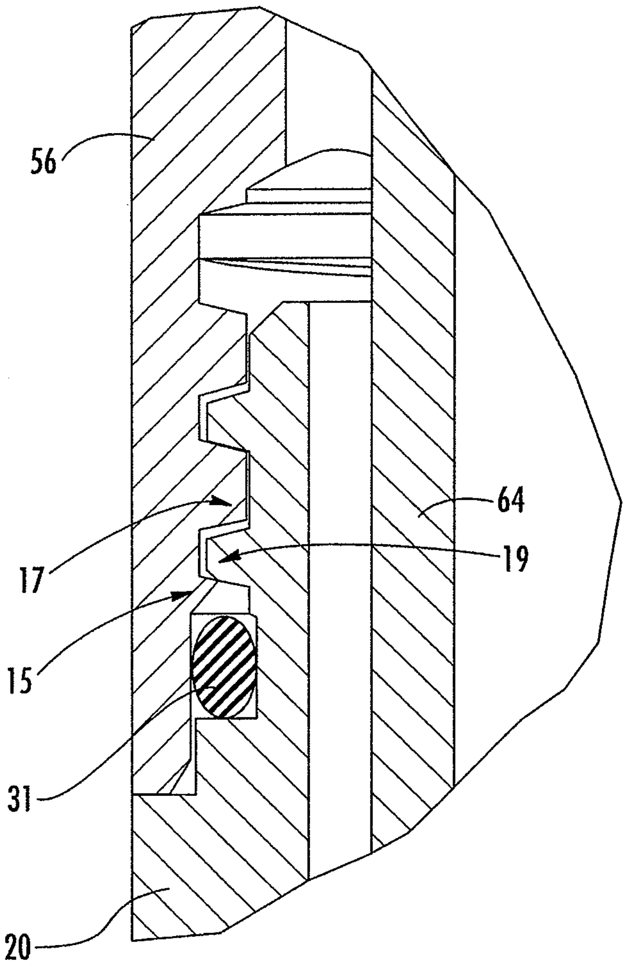
Figure 7:
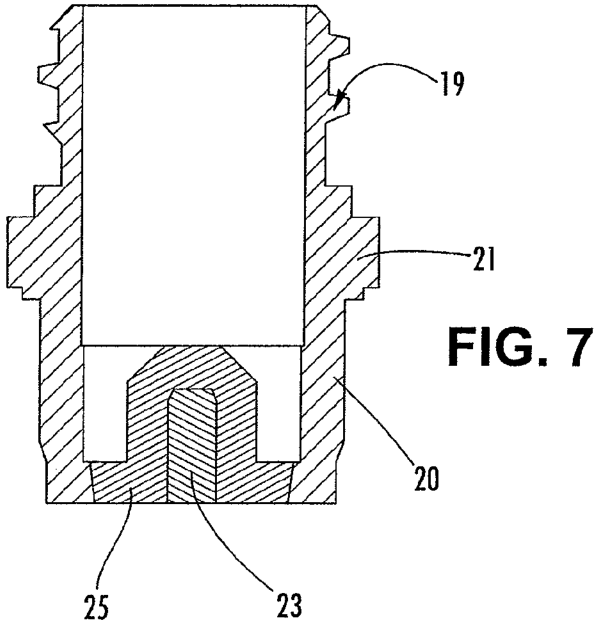
Figure 8A:
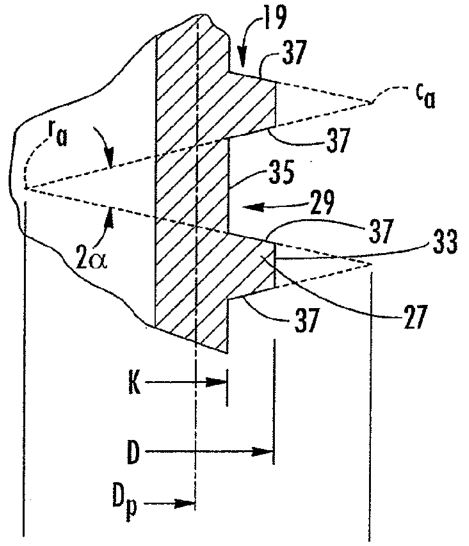
Figure 8B:
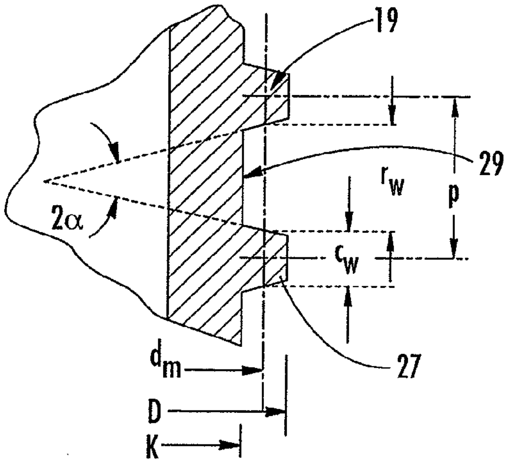
Figure 9:
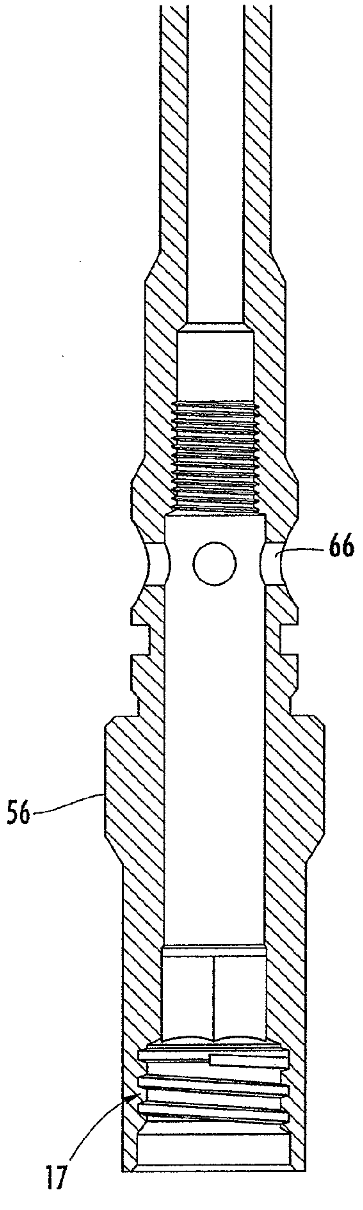
Figure 10A:
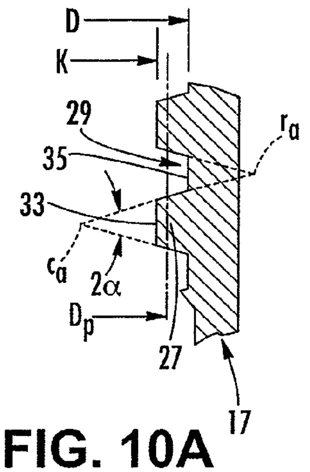
Figure 10B:
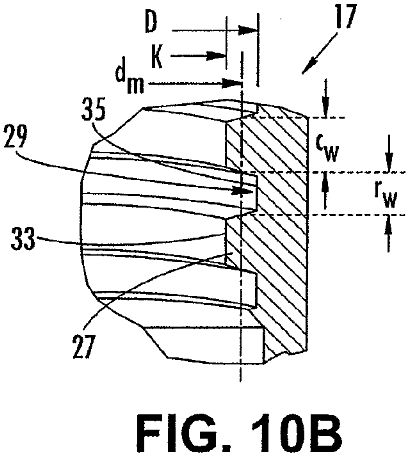

Having thus described the invention in general terms, reference will now be made to the accompanying drawings, which are not necessarily drawn to scale, and wherein:

FIG. 1 is a sectioned side view of a conventional shielding gas plasma arc torch illustrating an electrode assembly as used in the prior art;

FIG. 2 is a sectioned side view of the torch taken along a different section from FIG. 1 to illustrate coolant flow therethrough;

FIG. 3 is an enlarged view of the lower portion of the torch as seen in FIG. 1 and illustrating the conventional electrode assembly;

FIG. 4 is an enlarged view of the lower portion of torch as seen in FIG. 1 but showing the advantageous electrode and electrode holder according to the present invention;

FIG. 5 is a sectional view of the electrode and electrode holder according the invention;

FIG. 6 is a greatly enlarged view of the threaded connection between the electrode holder and the electrode according to the invention;

FIG. 7 is a sectional view of the electrode;

FIG. 8A is a greatly enlarged view of the male thread of the electrode;

FIG. 8B is the same view as FIG. 8A but provides some other dimensional references;

FIG. 9 is a sectional view of the electrode holder;

FIG. 10A is a greatly enlarged view of the female thread of the electrode holder; and FIG. 10B is the same view as FIG. 10A but provides other dimensional references corresponding to those in FIG. 8B.

DETAILED DESCRIPTION OF THE DRAWINGS

The present invention now will be described more fully hereinafter with reference to the accompanying drawings in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1-3, a prior plasma arc torch that benefits from the invention is broadly indicated by reference numeral 10. A plasma arc torch 10 using an electrode and electrode holder according to the present invention is illustrated in FIG. 4. The torch 10 is a shielding gas torch, which provides a swirling curtain or jet of shielding gas surrounding the electric arc during a working mode of operation of the torch. The torch 10 includes a generally cylindrical upper or rear insulator body 12 which may be formed of a potting compound or the like, a generally cylindrical main torch body 14 connected to the rear insulator body 12 and generally made of a conductive material such as metal, a generally cylindrical lower or front insulator body 16 connected to the main torch body 14, an electrode holder assembly 18 extending through the main torch body 14 and front insulator body 16 and supporting an electrode 20 at a free end of the electrode holder assembly, and a nozzle assembly 22 connected to the insulator body 16 adjacent the electrode 20.

A plasma gas connector tube 24 extends through the rear insulator body 12 and is connected by screw threads (not shown) into a plasma gas passage 26 of the main torch body 14. The plasma gas passage 26 extends through the main torch body 14 to a lower end face 28 thereof for supplying a plasma gas (sometimes referred to as a cutting gas), such as oxygen, air, nitrogen, or argon, to a corresponding passage in the insulator body 16.

A shielding gas connector tube 30 extends through the rear insulator body 12 and is connected by screw threads into a shielding gas passage 32 of the main torch body 14. The shielding gas passage 32 extends through the main torch body 14 to the lower end face 28 for supplying a shielding gas, such as argon or air, to a corresponding passage in the insulator body 16.

The insulator body 16 has an upper end face 34 that abuts the lower end face 28 of the main torch body. A plasma gas passage 36 extends through the insulator body 16 from the upper end face 34 into a cylindrical counterbore 38 in the lower end of the insulator body 16. As further described below, the counterbore 38, together with the upper end of the nozzle assembly 22, forms a plasma gas chamber 40 from which plasma gas is supplied to a primary or plasma gas nozzle of the torch. As such, plasma gas from a suitable source enters the plasma gas chamber 40 by flowing through the plasma gas connector tube 24, through the plasma gas passage 26 in the main torch body 14, into the plasma gas passage 36 of the insulator body 16, which is aligned with the passage 26, and into the chamber 40.

The nozzle, which is illustrated as a two-part nozzle assembly 22, includes an upper nozzle member 42, which has a generally cylindrical upper portion slidingly received within a metal insert sleeve 44 that is inserted into the counterbore 38 of the insulator body 16. An O-ring 46 seals the sliding interconnection between the upper nozzle member 42 and the metal insert sleeve 44. A lower nozzle tip 48 of generally frustoconical form also forms a part of the nozzle assembly 22, and is threaded into the upper nozzle member 42. The lower nozzle tip 48 includes a nozzle exit orifice 50 at the tip end thereof. The lower nozzle tip 48 and upper nozzle member 42 could alternatively be formed as one unitary nozzle. In either configuration, the nozzle channels the plasma gas from a larger distal opening 49 to the exit orifice 50. A plasma gas flow path thus exists from the plasma gas chamber 40 through the nozzle chamber 41 for directing a jet of plasma gas out the nozzle exit orifice 50 to aid in performing a work operation on a workpiece.

The plasma gas jet preferably has a swirl component created, in a known manner; by a hollow cylindrical ceramic gas baffle 52 partially disposed in a counterbore recess 54 of the insulator body 16. A lower end of the baffle 52 abuts an annular flange face of the upper nozzle member 42. The baffle 52 has non-radial holes (not shown) for directing plasma gas from the plasma gas chamber 40 into a lower portion of the nozzle chamber 41 with a swirl component of velocity.

The electrode holder assembly 18 includes a tubular electrode holder 56 which has its upper end connected by threads 11 within a blind axial bore 58 in the main torch body 14. The electrode holder 56 is somewhat consumable, although usually less so than the electrode itself, and thus the electrode holder and the axial bore 58 can also be provided with a threaded connection according to the present invention as discussed below. The upper end of electrode holder 56 extends through an axial bore 60 formed through the insulator body 16, and the lower end of the electrode holder 56 includes an enlarged internally screw-threaded coupler 62 which has an outer diameter slightly smaller than the inner diameter of the ceramic gas baffle 52 which is sleeved over the outside of the coupler 62. The electrode holder 56 also includes internal screw threads spaced above the coupler 62 for threadingly receiving a coolant tube 64 which supplies coolant to the electrode 20, as further described below, and which extends outward from the axial bore of the insulator body 16 into the central passage of the electrode 20. To prevent improper disassembly or reassembly of the coolant tube 64 and the electrode holder 56, the screw thread connection between those items may be cemented or otherwise secured together during manufacture to form an inseparable electrode holder assembly 18. The electrode 20 may be of the type described in U.S. Pat. No. 5,097,111, assigned to the assignee of the present application, and incorporated herein by reference.

The prior art electrode 20 comprises a cup-shaped body whose open upper end is threaded by screw threads 63 into the coupler 62 at the lower end of the electrode holder 56, and whose capped lower end is closely adjacent the lower end of the coolant tube 64. A coolant circulating space exists between the inner surface of the wall of the electrode 20 and the outer surface of the wall of the coolant tube 64, and between the outer surface of the wall of the coolant tube 64 and the inner surface of the wall of the electrode holder 56. The electrode holder 56 includes a plurality of holes 66 for supplying coolant from the space within the electrode holder to a space 68 between the electrode holder and the inner wall of the axial bore 60 in the insulator body 16. A seal 69 located between the holes 66 and the coupler 62 seals against the inner wall of the bore 60 to prevent coolant in the space 68 from flowing past the seal 69 toward the coupler 62. A raised annular rib or dam 71 on the outer surface of the electrode holder 56 is located on the other side of the holes 66 from the seal 69, for reasons which will be made apparent below. A coolant supply passage 70 (FIG. 2) extends through the insulator body from the space 68 through the outer cylindrical surface of the insulator body 16 for supplying coolant to the nozzle assembly 22, as further described below.

During starting of the torch 10, a difference in electrical voltage potential is established between the electrode 20 and the nozzle tip 48 so that an electric arc forms across the gap therebetween. Plasma gas is then flowed through the nozzle assembly 22 and the electric arc is blown outward from the nozzle exit orifice 50 until it attaches to a workpiece, at which point the nozzle assembly 22 is disconnected from the electric source so that the arc exists between the electrode 20 and the workpiece. The torch is then in a working mode of operation.

For controlling the work operation being performed, it is known to use a control fluid such as a shielding gas to surround the arc with a swirling curtain of gas. To this end, the insulator body 16 includes a shielding gas passage 72 that extends from the upper end face 34 axially into the insulator body, and then angles outwardly and extends through the cylindrical outer surface of the insulator body. A nozzle retaining cup assembly 74 surrounds the insulator body 16 to create a generally annular shielding gas chamber 76 between the insulator body 16 and the nozzle retaining cup assembly 74. Shielding gas is supplied through the shielding gas passage 72 of the insulator body 16 into the shielding gas chamber 76.

The nozzle retaining cup assembly 74 includes a nozzle retaining cup holder 78 and a nozzle retaining cup 80 which is secured within the holder 78 by a snap ring 81 or the like. The nozzle retaining cup holder 78 is a generally cylindrical sleeve, preferably formed of metal, which is threaded over the lower end of a torch outer housing 82 which surrounds the main torch body 14. Insulation 84 is interposed between the outer housing 82 and the main torch body 14. The nozzle retaining cup 80 preferably is formed of plastic and has a generally cylindrical upper portion that is secured within the cup holder 78 by the snap ring 81 and a generally frustoconical lower portion which extends toward the end of the torch and includes an inwardly directed flange 86. The flange 86 confronts an outwardly directed flange 88 on the upper nozzle member 42 and contacts an O-ring 90 disposed therebetween. Thus, in threading the nozzle retaining cup assembly 74 onto the outer housing 82, the nozzle retaining cup 80 draws the nozzle assembly 22 upward into the metal insert sleeve 44 in the insulator body 16. The nozzle assembly 22 is thereby made to contact an electrical contact ring secured within the counterbore 38 of the insulator body 16. More details of the electrical connections within the torch can be found in commonly-owned U.S. Pat. No. 6,215,090, which is incorporated by reference herein in its entirety.

The nozzle retaining cup 80 fits loosely within the cup holder 78, and includes longitudinal grooves 92 in its outer surface for the passage of shielding gas from the chamber 76 toward the end of the torch. Alternatively or additionally, grooves (not shown) may be formed in the inner surface of the cup holder 78. A shielding gas nozzle 94 of generally frustoconical form concentrically surrounds and is spaced outwardly of the lower nozzle tip 48 and is held by a shield retainer 96 that is threaded over the lower end of the cup holder 78. A shielding gas flow path 98 thus extends from the longitudinal grooves 92 in retaining cup 80, between the shield retainer 96 and the retaining cup 80 and upper nozzle member 42, and between the shielding gas nozzle 94 and the lower nozzle tip 48.

The shielding gas nozzle 94 includes a diffuser 100 that in known manner imparts a swirl to the shielding gas flowing into the flow path between the shielding gas nozzle 94 and the lower nozzle tip 48. Thus, a swirling curtain of shielding gas is created surrounding the jet of plasma gas and the arc emanating from the nozzle exit orifice 50.

With primary reference to FIG. 2, the coolant circuits for cooling the electrode 20 and nozzle assembly 22 are now described. The torch 10 includes a coolant inlet connector tube 112 that extends through the rear insulator body 12 and is secured within a coolant inlet passage 114 in the main torch body 14. The coolant inlet passage 114 connects to the center axial bore 58 in the main torch body. Coolant is thus supplied into the bore 58 and thence into the internal passage through the electrode holder 56, through the internal passage of the coolant tube 64, and into the space between the tube 64 and the electrode 20. Heat is transferred to the liquid coolant (typically water or antifreeze) from the lower end of the electrode (from which the arc emanates) and the liquid then flows through a passage between the lower end of the coolant tube 64 and the electrode 20 and upwardly through the annular space between the coolant tube 64 and the electrode 20, and then into the annular space between the coolant tube 64 and the electrode holder 18.

The coolant then flows out through the holes 66 into the space 68 and into the passage 70 through the insulator body 16. The seal 69 prevents the coolant in the space 68 from flowing toward the coupler 62 at the lower end of the holder 56, and the dam 71 substantially prevents coolant from flowing past the dam 71 in the other direction, although there is not a positive seal between the dam 71 and the inner wall of the bore 60. Thus, the coolant in space 68 is largely constrained to flow into the passage 70. The insulator body 16 includes a groove or flattened portion 116 that permits coolant to flow from the passage 70 between the insulator body 16 and the nozzle retaining cup 80 and into a coolant chamber 118 which surrounds the upper nozzle member 42. The coolant flows around the upper nozzle member 42 to cool the nozzle assembly.

Coolant is returned from the nozzle assembly via a second groove or flattened portion 120 angularly displaced from the portion 116, and into a coolant return passage 122 in the insulator body 16. The coolant return passage 122 extends into a portion of the axial bore 60 that is separated from the coolant supply passage 70 by the dam 71. The coolant then flows between the electrode holder 56 and the inner wall of the bore 60 and the bore 58 in the main torch body 14 into an annular space 126 which is connected with a coolant return passage 128 formed in the main torch body 14, and out the coolant return passage 128 via a coolant return connector tube 130 secured therein. Typically, returned coolant is recirculated in a closed loop back to the torch after being cooled.

In use, and with reference to FIG. 1, one side of an electrical potential source 210, typically the cathode side, is connected to the main torch body 12 and thus is connected electrically with the electrode 20, and the other side, typically the anode side, of the source 210 is connected to the nozzle assembly 22 through a switch 212 and a resistor 214. The anode side is also connected in parallel to the workpiece 216 with no resistor interposed therebetween. A high voltage and high frequency are imposed across the electrode and nozzle assembly, causing an electric arc to be established across a gap therebetween adjacent the plasma gas nozzle discharge. Plasma gas is flowed through the nozzle assembly to blow the pilot arc outward through the nozzle discharge until the arc attaches to the workpiece. The switch 212 connecting the potential source to the nozzle assembly is then opened, and the torch is in the transferred arc mode for performing a work operation on the workpiece. The power supplied to the torch is increased in the transferred arc mode to create a cutting arc, which is of a higher current than the pilot arc. Although illustrated herein with a torch that uses a high-frequency pilot signal to start an arc, the electrode and electrode holder according to the invention can also be used with blowback-type torches.

The electrode holder assembly 18 and novel threaded connection according to the present invention are illustrated in FIGS. 4-10. The electrode holder assembly 18 includes the tubular electrode holder 56, which has its upper end connected by threads 11 within the blind axial bore in the main torch body, as discussed above. The coolant tube 64 supplies coolant to the cup-shaped electrode 20, which has an open distal end secured to the electrode holder 56 by the advantageous threads 15 according to the present invention.

The threads 15 securing the electrode 20 to the electrode holder 56 can be seen in FIG. 5. The electrode holder 56 has a female threaded portion 17 formed therein and the electrode 20 has a male threaded portion 19 formed thereon. An O-ring 31 is provided to ensure adequate sealing and to prevent coolant from escaping from the electrode and electrode holder. The electrode 20 and the electrode holder 56 can be formed from a variety of different electrically conductive materials, but in one embodiment the electrode holder 56 is made of brass or a brass alloy and the electrode 20 comprises a body made of copper or a copper alloy. The coolant tube 64 can also be seen in FIG. 5, and it is illustrated with a distal end have a constant diameter in the axial direction. However, a coolant tube 64 having a distal end with an external diameter larger than a more medial portion of the coolant tube, such as the coolant tube 64 illustrated in FIGS. 1-3, could also be used. Advantageously, the external diameter of the distal end of the coolant tube 64 is less than internal diameter of the passage in the electrode holder through which coolant tube extends, and the threaded portion of the electrode holder is at least partially within the nozzle chamber 41 as seen in FIG. 4.

FIG. 6 is an enlarged view of the female threaded portion 17 of the electrode holder and the male threaded portion 19 of the electrode threadingly engaged together. The manufacturing clearances between the threads are illustrated. Although the electrode 20 is illustrated herein as being removably held in the plasma arc torch by way of an electrode holder 56, it is within the realm of the invention that the electrode 20 could be held within the torch by being threaded directly to the torch body 14 or some other component.

The electrode 20 as shown in the enlarged view of FIG. 7, comprises a generally cup-shape having the male threaded portion 19 at a proximal end thereof. An emissive element 23 and a relatively non-emissive separator 25 are held at the opposite end of a body 21 from the male threaded portion 19. The emissive element 23 is the component of the electrode from which the arc extends to the workpiece and is formed from an emissive material, such as hafnium. The relatively non-emissive separator 25 is formed from a relatively non-emissive material such as silver, and serves to prevent the arc from emanating from the body 21 of the electrode 20 instead of the emissive element 23.

A greatly enlarged view of the male threaded portion 19 can be seen in FIGS. 8A and 8B. The male threaded portion 19 defines at least one thread form extending helically and at least partially around the axis of the electrode 20. Although one thread form is illustrated, double-thread forms can also be used in some situations consistent within the scope of the invention. The thread form has a crest portion 27 and a root area 29 and which together define a crest profile for each helix of the thread form.

As shown in FIG. 8A, the male threaded portion 19 defines a minor diameter K and a major diameter D. A crest portion 27 defines a crest flat 33 and the root area 29 defines a root flat 35. Although illustrated as having flats 33, 35, it should be understood that threads can be formed in accordance with the principles of the present invention that have rounded or partially-rounded roots and crests.

The male threaded portion also defines flanks 37 that extend between the crest flats 33 and the root flats 35. The flanks 37 are shown as being straight in the drawing, and each defines a line that can be extended as shown by a broken line in the drawings. These extension lines extend towards each other and, at their points of intersection, define a crest apex $c_a$ and a root apex $r_a$. It is to be understood that at least one of the apices could comprise an actual apex of a thread profile for some configurations, but in the illustrated embodiments these apices are theoretical. A nominal pitch diameter $D_p$ is illustrated and is defined as the diameter that lies halfway between the crest apex $c_a$ and the root apex $r_a$. Reference here is made to *Machinery's Handbook*; Oberg, Jones and Horton; Industrial Press, Inc.; 1979.

For many conventional thread configurations, the nominal pitch diameter $D_p$ lies roughly halfway between the minor diameter K and the major diameter D. However, with the special thread configuration of embodiments of the present invention, where the thread root is much wider than the thread crest (in the male form), the nominal pitch diameter $D_p$ lies much closer to the thread axis. Indeed, while the nominal pitch diameter $D_p$ of a conventional thread may pass through the radial middle of the flanks of the thread, in the present invention the nominal pitch diameter $D_p$ is much smaller and may be no greater than the minor diameter K of the female threaded portion of the electrode holder (shown in FIGS. 10A & 10B), and in some embodiments may be no greater than the minor diameter K of the electrode. In others, the nominal pitch diameter $D_p$ maybe no more than about 105% of the minor diameter K of the electrode.

Another way of defining the benefits and advantages of the threaded connection according to the present invention is to consider the mean diameter of the threaded portions. The mean diameter allows definition of the invention without relying upon nominal pitch diameters, theoretical apices and extension lines and is helpful in a case, for example, where one or more of the thread forms has a curving profile but still embodies the advantages discussed herein. Although the flanks are illustrated herein as having a flat profile, the flanks could also be curved or segmented, or have some other shape, and still achieve the advantages of the invention. The mean diameter for the electrode is shown in FIG. 8B, where a mean diameter $d_m$ is halfway between the minor diameter K and the major diameter D. The mean diameter $d_m$ passes through the flanks of the thread and defines both a root area width $r_w$ and a crest portion width $c_w$ extending along the mean diameter $d_m$. As can be seen, the root area width $r_w$ of the male threaded portion is larger than the crest portion width $c_w$.

In one particular embodiment of the invention designed for use in the PT-19XLS torch available from Esab Cutting & Welding Products of Florence, S.C., the electrode 20 can have the following dimensions. The flanks of the threaded portion relative to the axis of the electrode 20 are manufactured so as to provide an included angle 2α that is 29°. The pitch p of the thread is 0.0833", which provides a thread count of 12 threads per inch (tpi). The length of the threaded portion can be 0.193" in the axial direction so that only a small amount of turning is necessary to seat the electrode 20, which can assist in rapid assembly. The minor diameter K is 0.389" and the major diameter D is 0.441". The crest apex $c_a$ thus lies at a diameter of 0.526" and the root apex $r_a$ lies at 0.203", and the nominal pitch diameter $D_p$ halfway between these two diameters is 0.364". Thus, the nominal pitch diameter $D_p$ is less than the minor diameter K of the electrode threaded portion.

The width of the root area $r_w$ is 0.055" and the width of the crest portion $c_w$ is 0.028". Thus, the width of the root area $r_w$ is greater than the width of the crest portion $c_w$ by at least 15%, and may be 55% wider, or 95% wider or more.

The profile of the thread crest may be consistent with a standard Stub Acme thread (as defined in ASME/ANSI standard for Stub Acme threads, No. B1.8, which is incorporated herein by reference) even though the root profile is wider than a standard Stub Acme thread. In particular, while the crest flat 33 has a width of 0.022", the root flat 35 has a width of 0.048", which is greater than 0.4224 times the pitch of threaded portion, and does not meet the ASME/ANSI standard. The thread form can be machined using tooling designed for a Stub Acme thread of 8 tpi even though the thread count for the final thread is 12 tpi due to the enlarged root profile relative to the crest profile of the thread form. Thus, the advantageous threaded connection according to the present invention can be made using conventional tooling.

Such a method can comprise an initial step of forming an electrode blank from a base material, such as copper, and defining at least one cylindrical surface on the exterior of the blank. Thereafter, material is removed from the cylindrical surface so as to define at least one helical thread form in the electrode blank. In particular, material is removed so as to form flanks defining the thread form; the flanks defining at least one line when viewed in cross section that intersects at a crest apex with a line defined by another of the flanks and also intersects at a root apex with a line defined by yet another of the flanks. The removal of material is discontinued at a depth that is above a depth halfway between the root apex and the crest apex. While machining is a practical way of forming the electrode from the blank, especially when using the conventional tooling as noted above, the electrode can also formed using other manufacturing methods, such as casting, etc.

A corresponding electrode holder 56 is illustrated in FIGS. 9, 10A and 10B. In particular, using the same terminology for FIGS. 8A and 8B, the major diameter D has a value of 0.449" and the minor diameter K has a value of 0.395". It should be noted here that the nominal pitch diameter of the electrode (0.364") is not greater the minor diameter of the electrode holder. The crest apex $c_a$ of the electrode holder thus lies at a diameter of 0.235" and the root apex $r_a$ lies at 0.557", and thus the nominal pitch diameter $D_p$ of the electrode holder halfway between these two diameters is 0.396", which is larger than the minor diameter of the electrode holder. The profile of the thread root is consistent with a standard Stub Acme thread even though the crest profile is wider than a standard Stub Acme thread. The crest flat 33 has a width of 0.041", which is greater than 0.4224 times the pitch of threaded portion, and does not meet the ASME/ANSI standard for Stub Acme threads, No. B1.8. The root flat 35 has a width of 0.028". The crest portion width $c_w$ is 0.048", and is larger than the root area width $r_w$ of 0.035". However, the thread form can be machined using tooling designed for a Stub Acme thread of 14 tpi even though the thread count for the final thread is 12 tpi due to the enlarged crest portion relative to the root area of the thread. The electrode holder can be formed using a similar method to that described above for the electrode.

As between the electrode and the electrode holder, the width of the root area $r_w$ of the electrode is 0.055" and the width of the root area $r_w$ of the electrode holder is 0.035" as noted above. The width of the root area of the electrode is greater than the width of the root area of the electrode holder by at least 35%, and may be 45% wider, or 55% wider or more.

The electrode holder 56 also has an opposite male threaded portion 11 as shown in FIG. 5. The dimensions are similar to those of the male threaded portion of the electrode. The width of the root area $r_w$ is 0.055" and the width of the crest portion $c_w$ is 0.028". Thus, the width of the root area $r_w$ is greater than the width of the crest portion $c_w$ by at least 15%, and may be 55% wider, or 95% wider or more.

Certain dimensions for the new threaded connections according to the invention are set forth in the table below, and can be compared to conventional ⅜"-24 tpi UN (Unified) and ½"-20 tpi UN threaded connections using dimensions and calculations from the applicable ANSI standard.

| | New-Male Electrode/ Female Electrode Holder | New-Male Electrode Holder/ Female Torch Body | Conventional (½")-Male Electrode/ Female Electrode Holder | Conventional (⅜")-Male Electrode Holder/ Female Torch Body |
|---|---|---|---|---|
| Threads per Inch | 12 | 12 | 20 | 24 |
| Male $D_p$ | 0.364 | 0.294 | 0.464 | 0.345 |
| Male K | 0.389 | 0.317 | 0.437 | 0.322 |
| Male D | 0.441 | 0.369 | 0.495 | 0.370 |
| Female $D_p$ | 0.396 | 0.324 | 0.470 | 0.350 |

-continued

| | New-Male Electrode/ Female Electrode Holder | New-Male Electrode Holder/ Female Torch Body | Conventional (½")-Male Electrode/ Female Electrode Holder | Conventional (⅜")-Male Electrode Holder/ Female Torch Body |
|---|---|---|---|---|
| Female K | 0.395 | 0.323 | 0.452 | 0.335 |
| Female D | 0.449 | 0.377 | 0.506 | 0.381 |
| P | 0.083 | 0.083 | 0.050 | 0.042 |
| 2α (deg.) | 29 | 29 | 60 | 60 |
| Male $d_m$ | 0.415 | 0.343 | 0.466 | 0.346 |
| Female $d_m$ | 0.422 | 0.350 | 0.479 | 0.358 |
| Female $r_w$ | 0.035 | 0.035 | 0.020 | 0.017 |
| Female $c_w$ | 0.048 | 0.048 | 0.030 | 0.025 |
| Male $r_w$ | 0.055 | 0.055 | 0.026 | 0.022 |
| Male $c_w$ | 0.028 | 0.028 | 0.024 | 0.020 |
| Female Crest Flat | 0.041 | 0.041 | 0.014 | 0.012 |
| Female Root Flat | 0.028 | 0.028 | 0.004 | 0.003 |
| Male Crest Flat | 0.022 | 0.022 | 0.007 | 0.006 |
| Male Root Flat | 0.048 | 0.048 | 0.009 | 0.008 |

All dimensions are inches except as noted

Given the space constraints available, the present invention advantageously provides a threaded connection that can be made between the electrode holder 56 and the electrode 20 with relatively low crest/root height compared to conventional designs. Although illustrated with the narrower crest profile being provided on the male thread portion of the electrode and the male thread portion of the electrode holder, the same relative compactness can be achieved by forming the narrower crest profile on a corresponding female threaded portion of the electrode holder and/or a female threaded portion of the torch body. Similarly, the positions of the male and female threads as between the electrode and the electrode holder and/or as between the electrode holder and the torch body can be reversed from those illustrated and still provide advantages of the type discussed above. The compact threaded connection provides an advantageous dimensional relationship within the torch.

The present invention also includes a more distal position for the electrode holder in the torch, and the threaded portion of the electrode holder engaged with the threaded portion of the electrode is advantageously partially or wholly within the nozzle chamber 41, as can be seen in FIG. 4. As a result, the electrode 20 is much shorter than prior art electrodes of this type, which reduces manufacturing costs. This is especially important because the electrode is a consumable part and is the most frequently replaced part of a plasma arc torch. The electrode holder 56 may also need to be periodically replaced. However, the replacement rate is much less often than that of the electrode 20.

Also, the "unequal" thread profiles of the electrode 20 and the electrode holder 56 allow for detrimental wear of the threads to be allocated more to the consumable electrode 20 than to the electrode holder 56. In other words, it is more important for the electrode holder to have wider crests for its threaded portion than for the electrode because the electrode holder is expected to securely hold many electrodes as the electrodes are consumed and replaced. This can cause wear and other damage to the threaded portions by repeated replacements, and the wider crests of the electrode holder (which are provided by the threaded portions of the electrode according to the invention) provide this additional durability.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. It should also be understood that reference to dimensions and angles of the various parts mentioned herein, including relative dimensions, are intended to relate to nominal dimensions representing a target value in a manufacturing processes. Thus, absolute values deviating from the nominal values by manufacturing tolerances are intended to be included within the scope of the dimensional and angular references.

That which is claimed:

1. An electrode configured for screwing into an electrode holder in a plasma arc torch, the electrode holder defining an internal female threaded portion having a thread form extending helically and having a major diameter and a minor diameter and having a crest flat and a root flat, the crest flat of the thread form of the female threaded portion being wider than the root flat of the female threaded portion, the electrode comprising:

an external male threaded portion having a thread profile extending helically along the electrode and having a major diameter and a minor diameter, the thread profile of the male threaded portion defining a pitch diameter that is not greater than the minor diameter of the female threaded portion of the electrode holder that the electrode is configured to screw into, wherein the thread profile of the male threaded portion comprises a root width and a crest width measured at a mean diameter of said thread profile, the root width being greater than the crest width.

2. The electrode of claim 1, wherein the pitch diameter of the thread profile of the male threaded portion is smaller than the minor diameter of the female threaded portion of the electrode holder.

3. An electrode configured for screwing into an electrode holder in a plasma arc torch, the electrode holder defining an internal female threaded portion having a thread form extending helically and having a major diameter and a minor diameter and having a crest flat and a root flat, the crest flat of the female threaded portion being wider than the root flat of the female threaded portion, the electrode comprising:

an external male threaded portion having a male thread profile extending helically along the electrode with a pitch P, the male threaded portion being configured such that a width between opposing flanks of consecutive turns of the male thread profile, as measured at the minor diameter of the female threaded portion that the electrode is configured to screw into, is wider than the male thread profile as measured at the minor diameter of the female threaded portion.

4. The electrode of claim 3, wherein the male thread profile defines a crest flat having a width not greater than 0.4224 times the pitch P.

5. An electrode configured for screwing into an electrode holder in a plasma arc torch, the electrode holder defining an internal female threaded portion having a thread form extending helically and having a major diameter and a minor diameter and having a crest flat and a root flat, the crest flat of the female threaded portion being wider than the root flat of the female threaded portion, the electrode comprising:

an external male threaded portion having a male thread profile extending helically along the electrode with a pitch P, the male threaded portion being configured such that a width between opposing flanks of consecutive turns of the male thread profile, as measured at a diameter midway between the major diameter and the minor diameter of the female threaded portion that the electrode is configured to screw into, is wider than the male thread profile as measured at said diameter midway between the major diameter and the minor diameter of the female threaded portion.

6. An electrode assembly for a plasma arc torch, comprising:

an electrode holder defining an internal female threaded portion having a thread form extending helically and having a major diameter and a minor diameter and having a crest flat and a root flat, the crest flat of the female threaded portion being wider than the root flat of the female threaded portion; and an electrode defining an external male threaded portion having a male thread profile extending helically along the electrode with a pitch P, the male threaded portion being configured such that a width between opposing flanks of consecutive turns of the male thread profile, as measured at the minor diameter of the female threaded portion of the electrode holder, is wider than the male thread profile as measured at the minor diameter of the female threaded portion.

7. An electrode assembly for a plasma arch torch, comprising:

an electrode holder defining an internal female threaded portion having a thread form extending helically and having a major diameter and a minor diameter and having a crest flat and a root flat, the crest flat of the female threaded portion being wider than the root flat of the female threaded portion; and an electrode defining an external male threaded portion having a male thread profile extending helically along the electrode with a pitch P, the male threaded portion being configured such that a width between opposing flanks of consecutive turns of the male thread profile, as measured at a diameter midway between the major diameter and the minor diameter of the female threaded portion of the electrode holder, is wider than the male thread profile as measured at said diameter midway between the major diameter and the minor diameter of the female threaded portion.

8. An electrode assembly for a plasma arch torch, comprising:

an electrode holder defining an internal female threaded portion having a thread form extending helically and having a major diameter and a minor diameter and having a crest flat and a root flat, the crest flat of the female threaded portion being wider than the root flat of the female threaded portion; and an electrode defining an external male threaded portion having a thread profile extending helically along the electrode and having a major diameter and a minor diameter, the thread profile of the male threaded portion defining a pitch diameter that is not greater than the minor diameter of the female threaded portion of the electrode holder wherein the thread profile of the male threaded portion comprises a root width and a crest width measured at a mean diameter of said profile, the root width being greater than the crest width.

9. The electrode of claim 1, wherein the thread profile of the male threaded portion defines a crest width that is smaller than a crest width of the female threaded portion of the electrode holder.

10. The electrode of claim 9, wherein the crest width of the female threaded portion of the electrode holder is greater than a root width of the female threaded portion of the electrode holder.

11. The electrode assembly of claim 8, wherein the thread profile of the male threaded portion defines a crest width that is smaller than a crest width of the female threaded portion of the electrode holder.

12. The electrode of claim 11, wherein the crest width of the female threaded portion of the electrode holder is greater than a root width of the female threaded portion of the electrode holder.

* * * * *

UNITED STATES PATENT AND TRADEMARK OFFICE

CERTIFICATE OF CORRECTION

PATENT NO. : 8,581,139 B2
APPLICATION NO. : 12/960797
DATED : November 12, 2013
INVENTOR(S) : Wayne Stanley Severance, Jr.

It is certified that error appears in the above-identified patent and that said Letters Patent is hereby corrected as shown below:

IN THE SPECIFICATION

In the CROSS-REFERENCE TO RELATED APPLICATIONS column 1, lines 7-12 should be canceled and the following inserted:

--This application is a continuation of U.S. Application Ser. No. 12/187,747, filed on Aug. 7, 2008, now abandoned, which is a divisional of U.S. Application Ser. No. 11/419,405, filed on May 19, 2006 now U.S. Pat. No. 7,423,235, which is a divisional of U.S. Application Ser. No. 10/933,877, filed on Sep. 3, 2004 now U.S. Pat. No. 7,081,597. These applications are incorporated herein by reference in their entirety.--

Signed and Sealed this
Eighth Day of March, 2016

Michelle K. Lee

Michelle K. Lee
*Director of the United States Patent and Trademark Office*